(12) United States Patent  (10) Patent No.: US 7,778,436 B2
Chung et al.  (45) Date of Patent: *Aug. 17, 2010

(54) VIBRATION-SOUND GENERATING DEVICE AND YOKE THEREOF

(75) Inventors: Seuk-Hwan Chung, Yongin-si (KR); Jun-Kun Choi, Suwon-si (KR); Sang-Won Kim, Seoul (KR); Seong-Geun Kim, Suwon-si (KR); Seok-Jun Park, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1222 days.

This patent is subject to a terminal disclaimer.

(21) Appl. No.: 11/345,335

(22) Filed: Feb. 2, 2006

(65) Prior Publication Data

US 2006/0233415 A1 Oct. 19, 2006

(30) Foreign Application Priority Data

Apr. 15, 2005 (KR) .................... 10-2005-0031490

(51) Int. Cl.
  *H04R 25/00* (2006.01)
(52) U.S. Cl. ...................... 381/412; 381/396
(58) Field of Classification Search ............... 381/191, 381/396, 400, 404, 412
See application file for complete search history.

(56) References Cited

U.S. PATENT DOCUMENTS

| 4,075,437 A | 2/1978 | Chin et al. | |
|---|---|---|---|
| 6,208,237 B1 * | 3/2001 | Saiki et al. | 340/388.1 |
| 6,560,347 B2 * | 5/2003 | Chung | 381/420 |
| 7,316,289 B2 * | 1/2008 | Ajiki et al. | 181/171 |
| 7,505,603 B2 * | 3/2009 | Yoo | 381/404 |

FOREIGN PATENT DOCUMENTS

| CH | 198198 | 9/1938 |
|---|---|---|
| CN | 1308418 | 8/2001 |
| CN | 1507302 | 6/2004 |
| DE | 19963413 | 7/2000 |
| DE | 10130909 | 10/2002 |
| JP | 58-192912 | 5/1985 |
| JP | 3-71799 | 3/1991 |
| JP | 52-105813 | 9/1997 |

(Continued)

OTHER PUBLICATIONS

Japanese Office Action dated Dec. 11, 2007 issued in JP 2006-015702.
Korean Office Action dated Jul. 11, 2006 issued in KR 2005-31490.
Taiwan Search Report dated Jun. 22, 2007 issued in TW 95101755.
German Office Action dated Jul. 6, 2007 issued in DE 2006002044.8-35.

(Continued)

*Primary Examiner*—Suhan Ni
(74) *Attorney, Agent, or Firm*—Stanzione & Kim LLP (57) ABSTRACT

A vibration-sound generating device and yoke thereof are described. The vibration-sound generating device comprises a diaphragm, a vibration part comprising a magnet and a yoke, which is positioned apart from the diaphragm by a desired distance, a suspension elastically supporting the vibration part, a supporting part supporting the diaphragm and the suspension, and a voice coil electromagnetically driving the diaphragm and the vibration part. The yoke of the invention has higher specific gravity and magnetic permeability than iron. So that it can improve performance of vibration and sound device.

11 Claims, 5 Drawing Sheets

FOREIGN PATENT DOCUMENTS

| | | |
|---|---|---|
| JP | 2003-251278 | 9/2003 |
| KR | 10-272305 | 8/1998 |
| KR | 2004-68356 | 7/2004 |
| TW | 200503575 | 1/2005 |

OTHER PUBLICATIONS

Chinese Office Action issued Mar. 23, 2010 in CN Application No. 200610003167.9.

* cited by examiner

- - - - → Direction of Magnetic Flux

VIBRATION-SOUND GENERATING DEVICE AND YOKE THEREOF

CROSS-REFERENCE TO RELATED APPLICATIONS

This application claims the benefit of Korean Patent Application No. 2005-31490 filed with the Korea Industrial Property Office on Apr. 15, 2005, the disclosure of which is incorporated herein by reference.

BACKGROUND OF THE INVENTION

1. Field of the Invention

This document relates to a vibration-sound generating device and yoke thereof and more particularly, a vibration-sound generating device and yoke thereof having improved vibration and sound performance.

2. Description of the Related Art

Recently, the release of mobile terminal, such as cellular phone or PDA, having camera and sound performance is increased rapidly. Accordingly, the needs for smaller mobile terminal is increasing, the use of vibration-sound device, which integrates a vibration motor, a receiver and a speaker so as to decrease in size and manufacturing price of the mobile terminal is augmented. Such vibration-sound devices according to the conventional art are disclosed in Korean Patent No. 10-0272305.

The vibration-sound device disclosed in KR Patent No. 10-0272305 functions by virtue of electromagnetic forces generated between a voice coil and a magnetic vibration part, which is composed of a yoke and a magnet when an alternating current is provided to the voice coil. The electromagnetic force is changed because the alternating current is provided into the voice coil. Consequently, the magnet and yoke which are supported by a suspension are vibrated by means of the electromagnetic force acted on the magnetic vibration part. Such generated vibration is transmitted to a case of the terminal through the suspension and the mobile terminal is vibrated accordingly. Besides, a diaphragm is attached on the voice coil and vibrated due to the force change of the alternating current provided into the voice coil thus, sound is generated.

The magnitude of vibration of a vibration-sound device is in proportion to the mass sum of a magnet, a yoke and a suspension that support the magnet. But the mass of the suspension and yoke of the conventional vibration-sound device is not high enough to generate desired sufficient vibration. To solve such a problem, a poise, that has more specific gravity than iron, is attached to the periphery of the yoke. But the conventional art which fabricates an extra poise and attaches it to the periphery of the yoke not only requires an additional process of attachment of the poise but also brings about a possibility of contact between the magnetic vibration part and the voice coil when the center of the poise and the yoke are eccentric.

The magnitude of sound generated by a vibration-sound device is in proportion to the intensity of a magnetic field of internal yoke in which a voice coil is positioned. But conventional vibration-sound devices have poor performance of a speaker because the magnetic flux passes through the voice coil is insufficient. This is because the volume of a magnet is limited due to the addition of the magnetic vibration part that generates vibration in compared to the usual speaker having a magnetic circuit part. Consequently, there is a necessity of magnetic field having sufficient magnetic flux density pass through the voice coil in order to improve the performance of the speaker.

SUMMARY OF THE INVENTION

The present invention provides vibration-sound generating devices having improved performance of vibration and speaker.

In one aspect, the invention features a vibration-sound generating device comprising a diaphragm, a vibration part comprising a magnet and a yoke which is positioned apart from the diaphragm by a desired distance, a suspension elastically supporting the vibration part, a supporting part supporting the diaphragm and the suspension, and a voice coil electromagnetically driving the diaphragm and the vibration part wherein the yoke has higher specific gravity and magnetic permeability than iron.

Additional aspects and advantages of the present general inventive concept will be set forth in part in the description which follows and, in part, will be obvious from the description, or may be learned by practice of the general inventive concept.

In another aspect, the invention features a vibration-sound generating device comprising a diaphragm, a vibration part comprising a magnet and a yoke which is positioned apart from the diaphragm by a desired distance, a suspension elastically supporting the vibration part, a supporting part supporting the diaphragm and the suspension, a voice coil electromagnetically driving the diaphragm, and a vibration coil electromagnetically driving the vibration part, wherein the yoke has more specific gravity and magnetic permeability than iron.

The yoke is formed from iron, one selected from a group consisting of osmium, platinum, tungsten and gold, and the other selected from a group consisting of nickel and cobalt. Preferably, the yoke is formed from iron, tungsten and nickel. More preferably the yoke comprises 4.4 wt %-50 wt % tungsten.

The yoke can be formed from injection molding of a mixture of iron, tungsten and nickel powder and sintering of it. The yoke can be also formed from tungsten and one selected from a group consisting of Permalloy, Mo Permalloy, Mumetal and Supermalloy. The yoke can comprise upper yoke and lower yoke attached respectively to the upper and lower surface of the magnet. And the yoke and the supporting part are preferably oval-shaped.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

First Embodiment

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
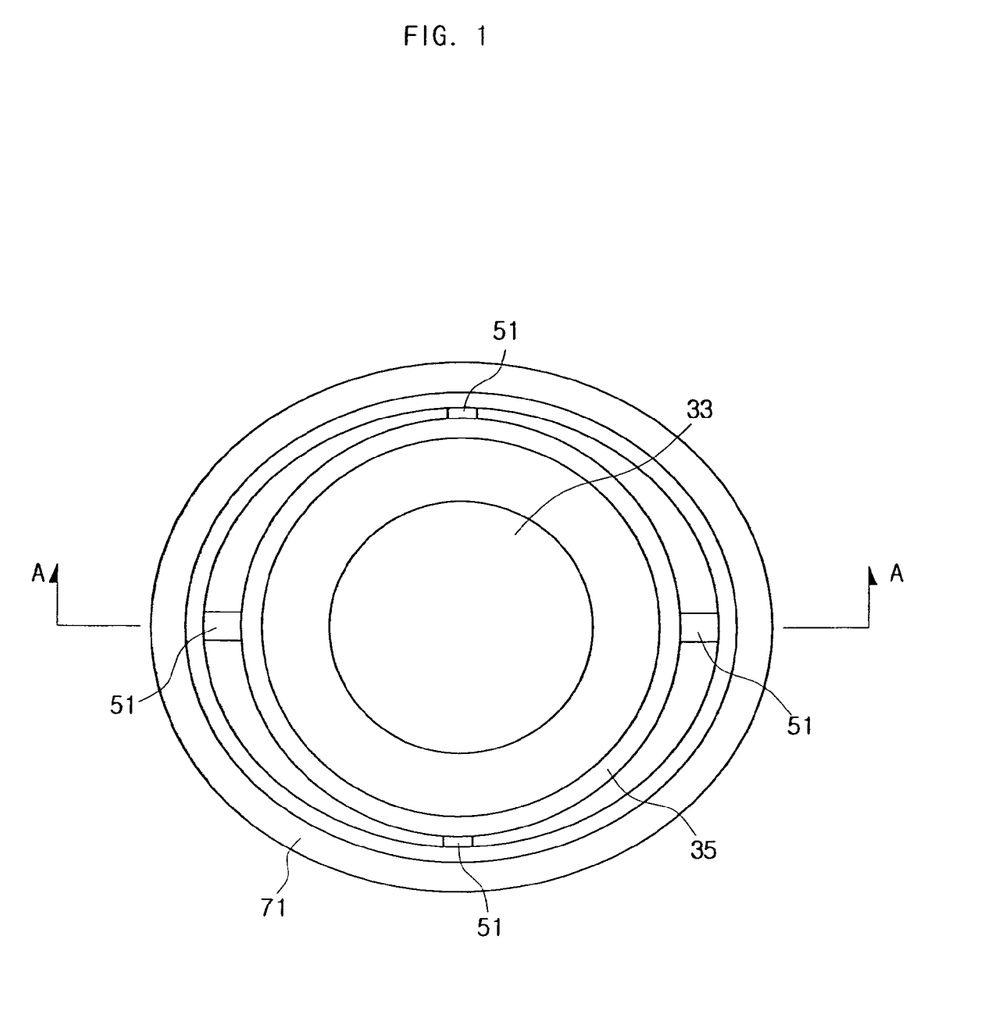
FIG. 1 is a plane view illustrating inner structure of a vibration-sound generating device according to one embodiment of the present invention.
Figure 2:
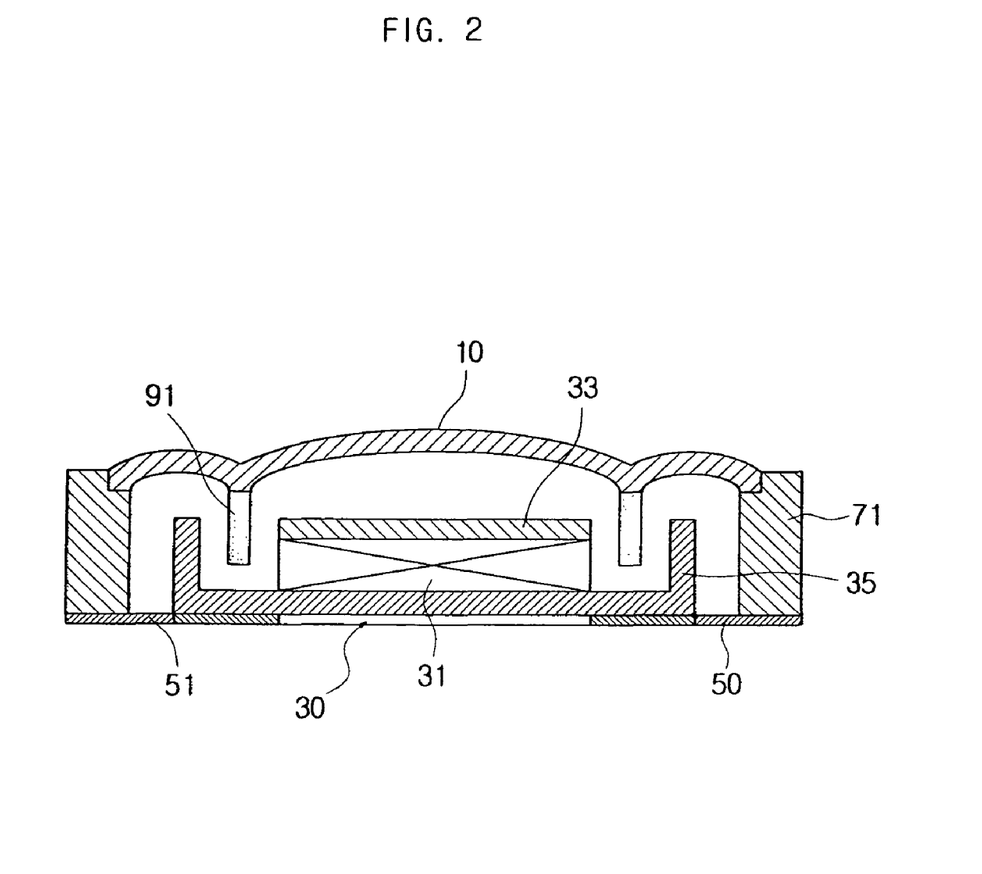
FIG. 2 is a sectional view illustrating a vibration-sound generating device on the line of AA' as illustrated in FIG. 1.

FIG. 1 is a plane view illustrating inner structure of a vibration-sound generating device according to one embodiment of the present invention and FIG. 2 is a sectional view on the line of AA' as illustrated in FIG. 1. The vibration-sound generating device of one embodiment of the present invention comprises a diaphragm 10, a vibration part 30, a suspension 50, a supporting part 71, and a voice coil 91.

Referring to FIG. 2, the diaphragm 10 is attached on upper surface of the supporting part 71. The diaphragm 10 is formed of titan or polycarbonate and has a thickness of 10 μm-50 μm. The diaphragm 10 attached to the voice coil 91 is vibrates and generates sound; this is because the electromagnetic force produced in accordance with the change of electric signal that is provided into the voice coil 91.

The suspension 50 fixes the vibration part 30 upon the supporting part 71 and transmits the oscillation of the vibration part 30 to the supporting part 71. Referring to FIG. 1 and FIG. 2, the suspension 50 is attached upon the lower surfaces of the vibration part 30 and the supporting part 71, respectively and has four arms 51 which connect the vibration part 30 to the supporting part 71. The number of the arm 51 is preferably more than three to prevent from rolling of the vibration part 30. The suspension 50 can be anything that connects the vibration part 30 to the supporting part 71 and transmits vibration generated by the vibration part 30 to the supporting part 71. For example, the suspension 50 can be a spring that connects the vibration part 30 to the supporting part 71.

The supporting part 71 has a short cylinder shape and supports the diaphragm 10 and the vibration part 30. The supporting part 71 can be formed from crashworthy plastic, such as fiberglass-reinforced plastic (FRP). The supporting part 71 is positioned generally in a receipt of the terminal. It is preferred that the supporting part 71 has an oval shape to reduce volume of the vibration-sound generating device.

The voice coil 91 can be fabricated by winding a coil coated with insulating layer and adhesive layer around a conduct such as copper or aluminum. The voice coil 91 is positioned between the magnet 31 and the lower yoke 35. The voice coil 91 generates sound by transmitting the vibration to the diaphragm 10, wherein the vibration is produced by cooperation between a magnet field generated by the magnet 31 and an electric field generated by currents applied to the voice coil 91. The vibration of the diaphragm 10 by providing currents into the voice coil 91 is generated on account of the Fleming's left-hand rule. Because the alternating current having variable baseband is input into the voice coil 91, the vibration part 30 vibrates and generates mechanical vibrations and the diaphragm 10 vibrates and generates sound in accordance with the change in frequency.

The vibration part 30 comprises the magnet 31, an upper yoke 33 and a lower yoke 35 and is vibrated by the voice coil 91 when it is elastically supported by the suspension 50. The lower yoke 35 can be formed to oval type to reduce the volume of the vibration-sound generating device.

Figure 6:
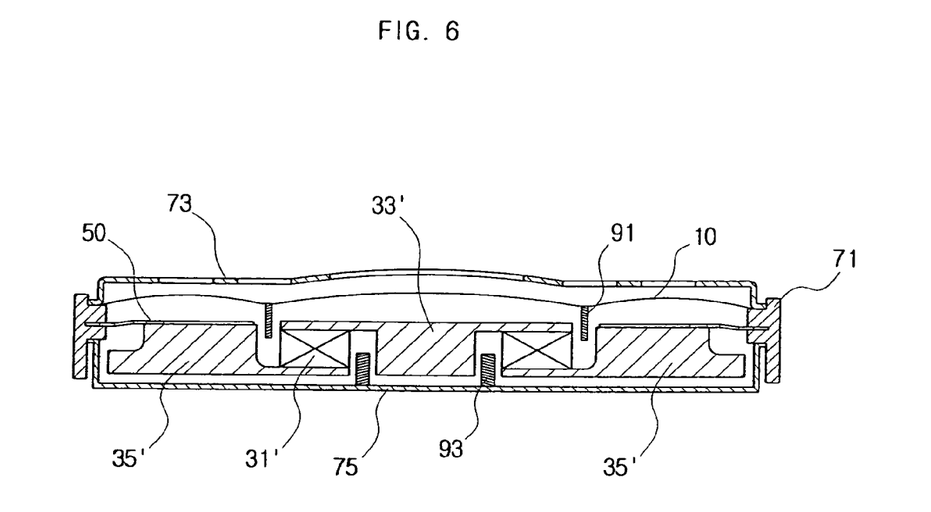
FIG. 6 is a sectional view of a vibration-sound generating device according to another embodiment of the present invention.

It is preferred that the magnet 31 is a permanent magnet formed from ferrite or neodymium and has a disc shape. The magnet 31 is attached upon the lower surface of the upper yoke 33 and the upper surface of the lower yoke 35. The N pole of the magnet 31 is contacted to the upper yoke 33 and the S pole is contacted to the lower yoke 35. Accordingly, as illustrated in FIG. 6, the magnet flux comes from the N pole enters the S pole passing through the lower yoke 35 and the voice coil 91.

The upper yoke 33, as illustrated in FIG. 1 and FIG. 2, has a disc shape which is corresponding to the sectional shape of the magnet 31 and is attached upon the magnet 31. The lower yoke 35 has a cylinder shape of which the upper part is opened. And the lower part of the lower yoke 35 is supported by the suspension 50 and connected to the supporting part 71.

The upper yoke 33 and lower yoke 35 are formed out of iron and materials which have higher specific gravity and magnetic permeability than iron to improve performance of vibration and speaker. The materials which have higher specific gravity and magnetic permeability than iron (specific gravity 7.8) are osmium (specific gravity 22.5), platinum (specific gravity 21.45), tungsten (specific gravity 19.3), gold (specific gravity 19.29) and so forth. And examples of ferromagnetic materials include iron, nickel, cobalt and so forth. Consequently, in order to improve specific gravity and magnetic permeability of the yoke, it formed out of iron, one selected from a group consisting of osmium, platinum and gold, and the other selected from a group consisting of nickel and cobalt.

Figure 3:
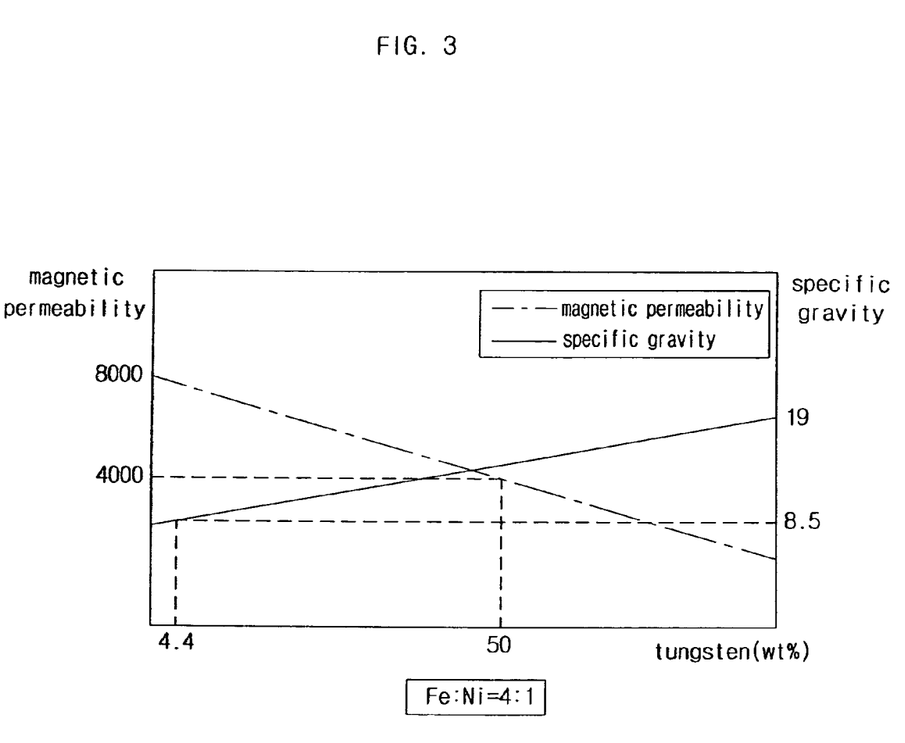
FIG. 3 is a graph illustrating the change of specific gravity and magnetic permeability according to the change of the weight rate of Tungsten.

FIG. 3 illustrates specific gravity and magnetic permeability of the yoke according to the rate change of tungsten. In FIG. 3, the x axis represents weight percent (wt %) of tungsten (at this point, iron and nickel are in the ratio of four to one) and the y axis represents magnetic permeability (B/H) and specific gravity.

Tungsten (W) has specific gravity of 19.3 at 0°, which is twice more than iron (7.8), and is inexpensive. Referring to FIG. 3, it is seen that as the weigh percent of tungsten is increased as compared to that of the iron and nickel, the specific gravity of the yoke is increased. But, if the weight percent of tungsten is decreased and the weight percent of iron and nickel is increased, the specific gravity of the yoke is reduced. Accordingly, to acquire desired specific gravity and magnetic permeability, it is necessary to control the weight percent of tungsten and nickel adequately. In this embodiment, to acquire more than 8.5 of the specific gravity and 4000 B/H of the magnetic permeability, as illustrated in FIG. 3, the weigh percent of tungsten can be in the range of from 4.4 wt % to 50 wt %. Namely, if the yoke comprises tungsten 4.4 wt %, iron 76.5 wt % and nickel 19.1 wt %, it has 8.5 of the specific gravity. Therefore, to acquire more than 8.5 of the specific gravity of the yoke, it is necessary to increase the weight percent of tungsten to more than 4.4 wt %. In addition, if the yoke is formed from tungsten 50 wt %, iron 40 wt % and nickel 10 wt %, it has 4000B/H permeability, and therefore it is necessary to control the weigh percent of the tungsten less than 50 wt %.

The present invention is not limited the above weight percent and the weight percent of the tungsten and nickel are adjustable according to where to place a great deal of weight in performance of vibration or speaker. In other words, the weight percent of tungsten can be increased to improve the performance of vibration. And the weight percent of the nickel can be increased to improve the performance of speaker.

The upper yoke 33 and lower yoke 35 can be formed from an alloy of tungsten and nickel alloy, such as permalloy, Mo permalloy or supermalloy. The permalloy composed of iron and 75 wt %-79 wt % of nickel has a maximum permeability of 105,000 (B/H), which is much bigger than common iron alloy. The improvement of the permalloy is Mo permalloy which replace a portion of the iron of the permalloy with molybdenum or chrome and has about 20,000 (B/H) of an initial permeability and 90,000 (B/H) of a maximum permeability. Supermalloy, a kind of Mo permalloy, is composed of 79 wt % nickel, 1.5 wt % chrome, and 5 wt % copper and has an initial permeability of 120,000 (B/H) and a maximum permeability of 900,000 (B/H).

The upper yoke 33 and lower yoke 35 can be formed from an injection molding of a mixture of iron, tungsten and nickel powder and a sintering process at a temperature of about 1250° C.

Figure 4:
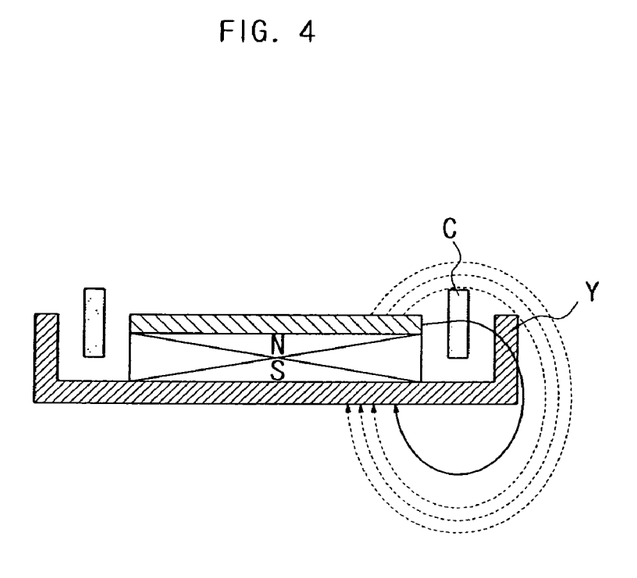
FIG. 4 is a sectional view illustrating a state of magnetic flux passing through a voice coil according to the conventional vibration-sound generating device.
Figure 5:
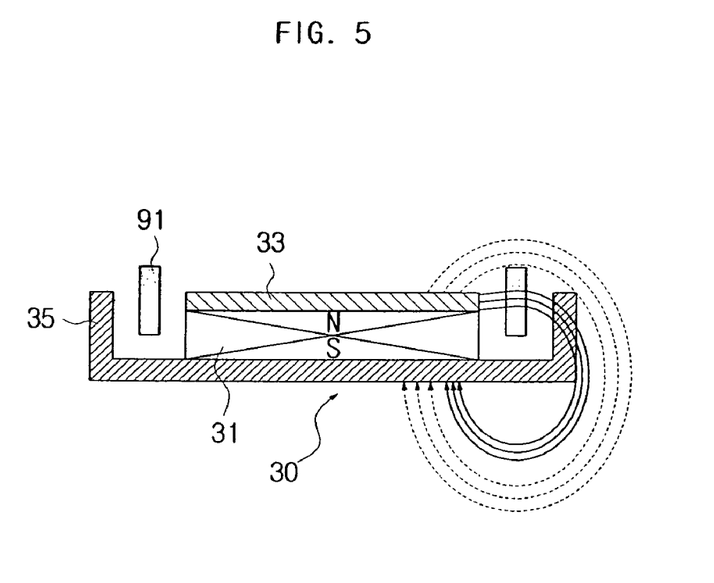
FIG. 5 is a sectional view illustrating a state of increased density of magnetic flux passing through a voice coil according to one embodiment of the present invention.

FIG. 4 is a sectional view of the magnetic flux passing through the voice coil according to the conventional vibration-sound generating device and FIG. 5 is a sectional view illustrating a state of increased density of magnetic flux passing through the voice coil according to one embodiment of the present invention.

In case of the upper yoke 33 and the lower yoke 35 are formed from material having a high permeability, such as nickel and Permalloy, the magnetic flux that comes from the N pole of the magnet 31 are concentrated on the side part of the lower yoke 5. Consequently, the density of the magnetic flux that passes through the voice coil 91 is increased as compared to the conventional vibration-sound generating device as illustrated in FIG. 4, so that the force to the voice coil 91 is increased by the Fleming's left-hand rule as below, $$F=BIL$$

Wherein B is density of the magnet flux, I is density of the current passing through the voice coil 91, L is length of the voice coil and F is force exerted to the voice coil 91. The density of the magnet flux B is increased because the yoke formed from nickel or nickel alloy facilitates the magnetic flux to concentrate on the voice coil 91. Accordingly, force exerted to the voice coil 91 is increased and the intensity of the vibration of the voice coil 91 is augmented. As a result, the performance of speaker is improved.

Operation of the First Embodiment

If an alternating current is provided into the voice coil 91, driving power is generated between the voice coil 91 and the vibration part 30. Because such driving power is changed according to the intensity of the alternating current input into the voice coil 91, the vibration part 30 is oscillated. And as a result of the oscillation of the vibration part 30, the suspension 50 and the supporting part 71 which are connected to the vibration part 30 are vibrated. At this time, the upper yoke 33 and the lower yoke 35 can have increased intensity of vibration because it has higher specific gravity than the conventional yoke.

Generally, the alternating current with a frequency corresponding to the resonance frequency of the vibration part 30 is input into the voice coil 91 to drive the vibration part 30. The resonance frequency of the vibration part 30 is in the range of 100 Hz-250 Hz and of course, the range can be altered according to the designed condition.

If the alternating current is input into the voice coil 91, force is exerted on the voice coil 91; this force vibrates the diaphragm 10 which is attached to the voice coil 91 at a range of audio frequency. If the frequency of the alternating current which is input into the voice coil 91 is higher than the resonance frequency of 250 Hz of the vibration part 30, the vibration part 30 is scarcely vibrated because it is out of the resonance frequency. But the diaphragm 10 is vibrated with the audio frequency so that it produces sound.

Because the upper yoke 33 and the lower yoke 35 involve nickel which has higher magnetic permeability than iron, the magnetic flux passing through the voice coil 91 are increased. Therefore, more force is exerted to the voice coil 91 and the performance of speaker is improved.

Second Embodiment

Referring to the FIG. 6, the vibration-sound generating device of another embodiment of the present invention comprises the diaphragm 10, a vibration part 30', the suspension 50, the supporting part 71, the voice coil 91, and a vibration coil 93. The diaphragm 10, suspension 50, supporting part 71 and voice coil 90 have same structure and function to the above embodiment; the following will explain the vibration part 30' and vibration part 93.

As illustrated in FIG. 6, the vibration part 30' comprises a magnet 31', a upper yoke 33' and a lower yoke 35'. The magnet 31' has a donut shape, and the upper and lower surface on which the upper yoke 33' and lower yoke upper 35' are attached respectively.

The upper yoke 33' is supported elastically to the supporting part 71 by the suspension 50. The lower yoke 35' attached to the magnet 31' is mounted on the lower surface of the suspension 50. The voice coil 91 is attached to the lower surface of the diaphragm 10 and protruded between the magnet 31' and the lower yoke 35'. The vibration coil 93 is attached to the lower cover 75 and protruded between the magnet 31' and the upper yoke 33'. The upper yoke 33' and the lower yoke 35' are formed from a material having high specific gravity and magnetic permeability as in the first embodiment. In FIG. 6, "73" is the upper cover which protects the diaphragm 10.

Operation of the Second Embodiment

Figure 7:
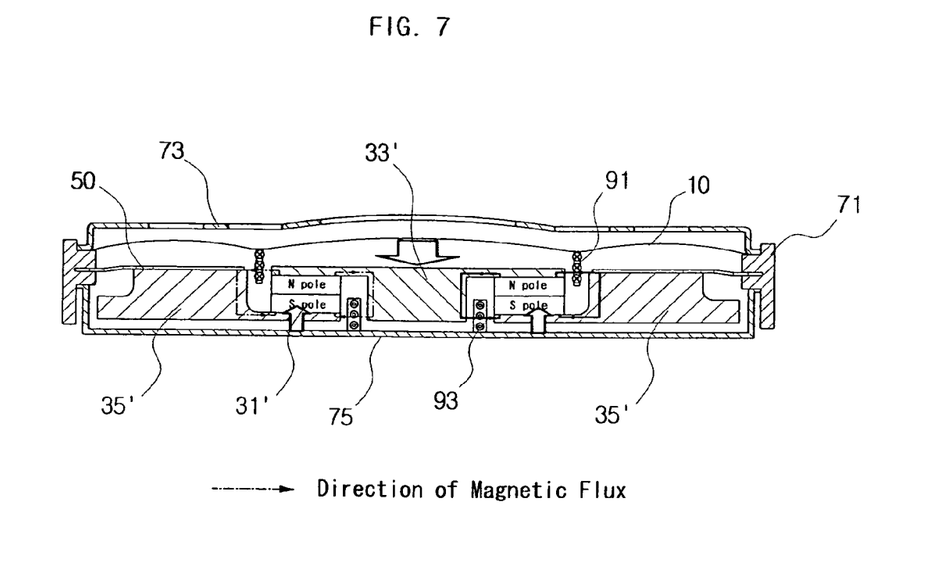
FIG. 7 is a sectional view illustrating generation of the sound and vibration according to another embodiment of the present invention.

Referring to FIG. 7, the magnetic flux forms a magnetic field that comes from the N pole of the magnet 31', passes through the upper yoke 33' and lower yoke 35' and then directs to the S pole of the magnet 30'. If a high frequency current is provided into the voice coil 91, the voice coil 91 is vibrated upwardly and downwardly by the cooperation between the magnetic field generated by the magnet 31' and the electric field generated by the voice coil 91. As a result, the diaphragm 10 is vibrated upwardly and downwardly and generates a sound.

If a low frequency current is provided into the vibration coil 93, the vibration part 30' is vibrated upwardly and downwardly by the cooperation between the magnetic field generated by the magnet 31' and the electric field generated by the voice coil 91. As a result, the vibration-sound generating device is vibrated.

Although the foregoing description details various embodiments of the invention, it will be appreciated that the embodiments are only examples of implementing the spirit of the invention, and that any changed or modified examples remain within the scope of the invention so long as they do not depart from the spirit of the invention.

INDUSTRIAL AVAILABILITY

The present invention can provide vibration-sound generating devices and yoke thereof having improved performance of vibration and sound because the yoke has high specific gravity and magnetic permeability.

In addition, the vibration-sound generating devices and yoke thereof according to the present invention can reduce its volume because of the improvement of the performance of vibration and sound. Therefore, the present invention facilities the design of the mobile terminal such as cellular phone and PDA.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A vibration-sound generating device comprising:
   a diaphragm;
   a vibration part comprising a magnet and a yoke which is positioned apart from the diaphragm by a desired distance;
   a suspension elastically supporting the vibration part;
   a supporting part supporting the diaphragm and the suspension; and
   a voice coil electromagnetically driving the diaphragm and the vibration part,
   wherein the yoke is formed from iron, one material selected from a group consisting of osmium, platinum, tungsten and gold, and another material selected from a group consisting of nickel and cobalt.

2. The vibration-sound generating device according to claim 1, wherein the yoke is formed from iron, tungsten and nickel.

3. The vibration-sound generating device according to claim 2, wherein the yoke comprises 4.4 wt %-50 wt % tungsten.

4. The vibration-sound generating device according to claim 3,
   wherein the yoke comprises a upper yoke and a lower yoke attached respectively to the upper and lower surface of the magnet.

5. The vibration-sound generating device according to claim 2,
   wherein the yoke is formed by an injection molding of a mixture of iron, tungsten, and nickel powder and sintering thereof.

6. The vibration-sound generating device according to claim 5,
   wherein the yoke comprises a upper yoke and a lower yoke attached respectively to the upper and lower surface of the magnet.

7. The vibration-sound generating device according to claim 2,
   wherein the yoke is formed from tungsten and one selected from a group consisting of Permalloy, Mo Permalloy, Mumetal, and Supermalloy.

8. The vibration-sound generating device according claim 7,
   wherein the yoke comprises a upper yoke and a lower yoke attached respectively to the upper and lower surface of the magnet.

9. The vibration-sound generating device according to claim 2,
   wherein the yoke comprises a upper yoke and a lower yoke attached respectively to the upper and lower surface of the magnet.

10. The vibration-sound generating device according to claim 1,
    wherein the yoke comprises a upper yoke and a lower yoke attached respectively to the upper and lower surface of the magnet.

11. The vibration-sound generating device according to claim 10,
    wherein the yoke and the supporting part have oval shape.

* * * * *